United States Patent
Hwang et al.

(10) Patent No.: US 7,969,843 B2
(45) Date of Patent: Jun. 28, 2011

(54) WRITE ONCE DISC ALLOWING MANAGEMENT OF DATA AREA, METHOD OF MANAGING THE DATA AREA, AND APPARATUS AND METHOD FOR REPRODUCING DATA FROM WRITE ONCE DISC

(75) Inventors: Sung-hee Hwang, Seoul (KR); Jung-wan Ko, Suwon-si (KR); Kyung-geun Lee, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/837,190

(22) Filed: Jul. 15, 2010

(65) Prior Publication Data

US 2010/0284255 A1 Nov. 11, 2010

Related U.S. Application Data

(63) Continuation of application No. 11/944,486, filed on Nov. 23, 2007, now Pat. No. 7,787,338, which is a continuation of application No. 11/430,854, filed on May 10, 2006, now Pat. No. 7,391,690, which is a continuation of application No. 11/241,984, filed on Oct. 4, 2005, now Pat. No. 7,362,675, which is a continuation of application No. 10/797,050, filed on Mar. 11, 2004, now Pat. No. 7,313,066.

(60) Provisional application No. 60/477,955, filed on Jun. 13, 2003.

(30) Foreign Application Priority Data

| Mar. 13, 2003 | (KR) | 10-2003-0015858 |
| Mar. 31, 2003 | (KR) | 10-2003-0019964 |
| Feb. 5, 2004 | (KR) | 10-2004-0007533 |

(51) Int. Cl.
*G11B 7/00* (2006.01)

(52) U.S. Cl. .............. 369/53.17; 369/59.25; 369/275.3

(58) Field of Classification Search ............. 369/30.21, 369/30.24, 30.36, 47.14, 53.17, 59.25, 275.3
See application file for complete search history.

(56) References Cited

U.S. PATENT DOCUMENTS 4,833,665 A 5/1989 Tokumitsu et al.
(Continued)

FOREIGN PATENT DOCUMENTS

CA 2 351 502 A1 * 3/2001
(Continued)

OTHER PUBLICATIONS

"EMCA 238 Data interchange on 130mm optical disks of type WORM using irreversible effects—capacity 2,6 G-bytes per cartridge." ECMA, Jun. 1996, pp. 54-60.
(Continued)

*Primary Examiner* — Wayne R Young
*Assistant Examiner* — Thomas D Alunkal
(74) *Attorney, Agent, or Firm* — NSIP Law

(57) ABSTRACT

A write once disc allowing management of a data area, includes a lead-in zone, a data area, and a lead-out zone. The write once disc includes a predetermined area storing area allocation information which indicates whether at least one section of the data area is allocated for disc defect management. In the disc and method, area allocation information specifying a structure of the data area is recorded on the disc, thus allowing a recording/reproducing apparatus to recognize the data area structure. Therefore, allocating areas, such as a spare area, for disc defect management other than an area for storing user data, to the data area is possible. The allocation of the areas for disc defect management to the data area enables effective use of the write once disc.

3 Claims, 17 Drawing Sheets

U.S. PATENT DOCUMENTS

| | | | |
|---|---|---|---|
| 5,303,219 | A | 4/1994 | Kulakowshi et al. |
| 5,319,626 | A | 6/1994 | Ozaki et al. |
| 5,404,357 | A | 4/1995 | Ito et al. |
| 5,526,335 | A | 6/1996 | Tamegai |
| 5,715,221 | A | 2/1998 | Ito et al. |
| 5,841,748 | A | 11/1998 | Yamamuro |
| 5,914,928 | A | 6/1999 | Takahashi |
| 5,991,253 | A | 11/1999 | Yamamuro |
| 6,160,778 | A * | 12/2000 | Ito et al. ................ 369/53.15 |
| 6,249,884 | B1 | 6/2001 | Joo |
| 6,282,365 | B1 | 8/2001 | Gotoh et al. |
| 6,292,625 | B1 | 9/2001 | Gotoh et al. |
| 6,314,078 | B1 * | 11/2001 | Takagi et al. ............ 369/275.3 |
| 6,469,978 | B1 * | 10/2002 | Ohata et al. |
| 6,564,345 | B1 * | 5/2003 | Kim et al. ................ 714/723 |
| 6,581,167 | B1 * | 6/2003 | Gotoh et al. |
| 6,611,483 | B1 * | 8/2003 | Park et al. ................ 369/53.21 |
| 6,754,860 | B2 * | 6/2004 | Kim et al. |
| 6,922,802 | B2 * | 7/2005 | Kim et al. |
| 6,963,523 | B1 * | 11/2005 | Park |
| 7,000,152 | B1 * | 2/2006 | Lin |
| 7,313,066 | B2 * | 12/2007 | Hwang et al. |
| 7,362,675 | B2 * | 4/2008 | Hwang et al. |
| 7,366,068 | B2 * | 4/2008 | Hwang et al. |
| 2002/0009028 | A1 | 1/2002 | Ijtsma et al. |
| 2002/0015370 | A1 | 2/2002 | Yoshida et al. |
| 2002/0105868 | A1 * | 8/2002 | Ko ............................. 369/47.14 |
| 2002/0136537 | A1 * | 9/2002 | Takahashi ...................... 386/95 |
| 2002/0159382 | A1 * | 10/2002 | Ohata et al. ................ 369/275.3 |
| 2002/0191499 | A1 * | 12/2002 | Ando et al. ................ 369/30.03 |
| 2003/0123348 | A1 | 7/2003 | Ozaki |
| 2004/0076096 | A1 | 4/2004 | Hwang et al. |
| 2004/0165496 | A1 | 8/2004 | Park et al. |
| 2008/0175118 | A1 | 7/2008 | Hwang et al. |

FOREIGN PATENT DOCUMENTS

| | | | |
|---|---|---|---|
| CN | 1689082 | * | 10/2005 |
| CN | 1698122 | * | 11/2005 |
| DE | 199 54 954 A1 | * | 5/2001 |
| EP | 0 350 920 A2 | * | 1/1990 |
| EP | 0 908 882 A2 | * | 4/1999 |
| EP | 1 547 069 | * | 9/2004 |
| EP | 1 599 871 | * | 9/2004 |
| EP | 1 612 790 | | 1/2006 |
| JP | 08-147702 | | 6/1996 |
| JP | 08-273162 | | 10/1996 |
| JP | 09-270175 | | 10/1997 |
| JP | 2000-195178 | | 7/2000 |
| JP | 2002-329321 A | | 11/2002 |
| JP | 2003-030844 | | 1/2003 |
| KR | 10-2001-0076439 A | | 8/2001 |
| WO | WO 2004/077411 A2 | | 9/2004 |
| WO | WO 2004/079731 A1 | | 9/2004 |
| WO | WO 2004-081922 A1 | | 9/2004 |

OTHER PUBLICATIONS

Canadian Office Action issued on Nov. 19, 2009, in Canadian Application No. 2515246 (6 pages).
European Office Action issued on Nov. 12, 2009, in European Application No. 07108550.0 (6 pages).
Japanese Office Action issued on Jan. 12, 2010, in corresponding Japanese Application No. 2006-507752 (3 pages).
Korean Notice of Allowance issued on Nov. 30, 2009, in Korean Application No. 10-2003-0015858 (5 pages, in Korean, partial English translation).
Letter of reply to EPO dated Feb. 1, 2008, cited in European Office Action issued on Nov. 12, 2009, in European Application No. 07108550.0 (7 pages).
Office Action dated May 16, 2008 of the Chinese Patent Application No. 2006100931333.
Office Action issued in Korean Patent Application No. 10-2003-0015858 on May 19, 2009.
Office Action issued on Jun. 29, 2007 by the Chinese Intellectual Property Office for Chinese Patent Application No. 2006100931333.
Office Action issued on Oct. 2, 2006 by the Taiwan Intellectual Property Office for Taiwanese Patent Application No. 93106611.
Search Report issued on Mar. 30, 2007 by the European Patent Office for European Patent Application No. 04719681.1.

* cited by examiner

FIG. 10

| LEAD_IN ZONE | ... |
| | DMA #2 |
| | RECORDING CONDITION TEST AREA |
| | TDMA #1 |
| | DRIVE INFORMATION AREA |
| | DMA #1 |
| | ... |
| DATA AREA | SPARE AREA1 |
| | USER DATA AREA |
| | TDMA #2 |
| | SPARE AREA2 |
| LEAD_OUT ZONE | ... |
| | DMA #4 |
| | ... |
| | DMA #3 |
| | ... |

FIG. 11

| TDDS+SBM #0 |
| TDFL #0 |
| TDDS+SBM #1 |
| ... |

TDMA #1

FIG. 12

| | | |
|---|---|---|
| TDDS | TDDS IDENTIFIER | |
| | TDDS UPDATE COUNT | |
| | DRIVE INFORMATION POSITION INFORMATION | |
| | TDFL POSITION INFORMATION | |
| | RECORDING CONDITION TESTABLE POSITION INFORMATION | |
| | POSITION INFORMATION REGARDING TDDS+SBM AREA FOR ANOTHER RECORD LAYER | |
| | POSITION INFORMATION REGARDING TDDS+SBM IN ANOTHER TDMA | |
| | SIZE OF TDMA #2 | |
| | SIZE OF SPARE AREA #1 | |
| | SIZE OF SPARE AREA #2 | |
| | ... | |
| SBM | SBM HEADER | SBM IDENTIFIER |
| | | SBM UPDATE COUNT |
| | | FINALIZATION FLAG |
| | BIT MAP | ... |

FIG. 13

| TDDS | TDDS IDENTIFIER | | |
|---|---|---|---|
| | TDDS UPDATE COUNT=00h | | |
| | POSITION INFORMATION REGARDING DRIVE INFORMATION | | |
| | TDFL POSITION INFORMATION=00h | | |
| | RECORDING CONDITION TESTABLE POSITION INFORMATION | | |
| | POSITION INFORMATION REGARDING TDDS+ SBM IN ANOTHER RECORD LAYER=00h | | |
| | POSITION INFORMATION REGARDING TDDS+ SBM IN ANOTHER TDMA=00h | | |
| | SIZE OF TDMA #2 | | |
| | SIZE OF SPARE AREA #1 | | |
| | SIZE OF SPARE AREA #2 | | |
| | ... | | |
| SBM | SBM HEADER | SBM IDENTIFIER | |
| | | SBM UPDATE COUNT=00h | |
| | | FINALIZATION FLAG=0 | |
| | BIT MAP | ... | |

FIG. 14

| TDDS | TDDS IDENTIFIER | | |
|---|---|---|---|
| | TDDS UPDATE COUNT=n+1 | | |
| | POSITION INFORMATION REGARDING DRIVE INFORMATION | | |
| | TDFL POSITION INFORMATION | | |
| | RECORDING CONDITION TESTABLE POSITION INFORMATION | | |
| | POSITION INFORMATION REGARDING TDDS+ SBM IN ANOTHER RECORD LAYER | | |
| | POSITION INFORMATION REGARDING TDDS+ SBM IN ANOTHER TDMA | | |
| | SIZE OF CHANGED SPARE AREA #1 | | |
| | SIZE OF CHANGED SPARE AREA #2 | | |
| | ... | | |
| SBM | SBM HEADER | SBM IDENTIFIER | |
| | | SBM UPDATE COUNT=n+1 | |
| | | FINALIZATION FLAG=0 | |
| | BIT MAP | ... | |

FIG. 15

| | |
|---|---|
| | FINALIZATION FLAG=0 |
| SBM #0 | UPDATE COUNTER=0 |
| | BIT MAP #0 |
| | FINALIZATION FLAG=0 |
| SBM #1 | UPDATE COUNTER=1 |
| | BIT MAP #1 |
| ... | ... |
| | FINALIZATION FLAG=0 |
| SBM #n | UPDATE COUNTER=n |
| | BIT MAP #n |
| ... | ... |

FIG. 16

| | |
|---|---|
| SBM #0 | FINALIZATION FLAG=0 |
| | UPDATE COUNTER=0 |
| | BIT MAP #0 |
| SBM #1 | FINALIZATION FLAG=0 |
| | UPDATE COUNTER=1 |
| | BIT MAP #1 |
| ... | ... |
| SBM #n | FINALIZATION FLAG=0 |
| | UPDATE COUNTER=n |
| | BIT MAP #n |
| SBM #n | FINALIZATION FLAG=1 |
| | UPDATE COUNTER=n |
| | BIT MAP #n |
| NON-RECORDING AREA | ffh |
| ... | ... |

WRITE ONCE DISC ALLOWING MANAGEMENT OF DATA AREA, METHOD OF MANAGING THE DATA AREA, AND APPARATUS AND METHOD FOR REPRODUCING DATA FROM WRITE ONCE DISC

CROSS-REFERENCE TO RELATED APPLICATIONS

This application is a continuation of application Ser. No. 11/944,486, filed on Nov. 23, 2007, now pending; which is a continuation of application Ser. No. 11/430,854, filed on May 10, 2006, now U.S. Pat. No. 7,391,690; which is a continuation of application Ser. No. 11/241,984, filed on Oct. 4, 2005, now U.S. Pat. No. 7,362,675; which is a continuation of application Ser. No. 10/797,050, filed on Mar. 11, 2004, now U.S. Pat. No. 7,313,066; which claims the priorities of Korean Patent Application No. 2003-15858, filed on Mar. 13, 2003, Korean Patent Application No. 2003-19964, filed on Mar. 31, 2003; and Korean Patent Application No. 2004-7533, filed on Feb. 5, 2004; and U.S. Provisional Patent Application No. 60/477,955, filed on Jun. 13, 2003, the entire disclosure of each of which is incorporated herein by reference for all purposes.

BACKGROUND

1. Field

The following description relates to a write once disc, and more particularly, to a write once disc which allows allocation of an area storing data other than user data, a method of managing a data area of the write once disc, an apparatus recording data in the write once disc, and a method and apparatus reproducing data from the write once disc.

2. Description of the Related Art

Defect management is performed to allow a user to rewrite user data of a portion of a user data area in which a defect occurs to a new portion of the user data area of a disc, thereby compensating for a loss in data caused by the defect. In general, defect management is performed using linear replacement or slipping replacement methods. In the linear replacement method, a user data area in which a defect occurs is replaced with a spare data area having no defects. In the slipping replacement method, a user data area having a defect is slipped to use the next user data area having no defects.

Both linear replacement and slipping replacement methods are applicable only to discs such as a DVD-RAM/RW on which data can be repeatedly recorded and recording can be performed using a random access method.

Meanwhile, methods of disc defect management even on a write once disc on which rewriting of data is not allowed, using the linear replacement method have been developed.

However, there are cases where disc defect management cannot be performed on a write once disc with a recording/reproducing apparatus, using the linear replacement method. For instance, when data is recorded on the write once disc in real time, it is difficult to perform disc defect management thereon with the recording/reproducing apparatus, using the linear replacement method.

For this reason, a spare area is allocated to a write once disc only when disc defect management using the recording/reproducing apparatus is required. That is, the allocation of the spare area is determined by a user's intention.

Also, it is possible to allocate not only spare areas but also other areas to a data area of the write once disc for disc defect management, if necessary.

However, when other areas, not for user data, are allocated to the data area, the recording/reproducing apparatus is not capable of recognizing the structure of the data area.

In other words, if the write once disc contains no information regarding the data area structure, the recording/reproducing apparatus is not capable of determining whether other areas for information other than user data are allocated to the data area or not, and determining the position and size of a user data area when the other areas are formed.

After a write operation, information that specifies areas containing data is written in a bit map format to a predetermined area of a disc, thereby enabling facilitation of a further write operation or a read operation.

More specifically, a recordable area of a disc consists of a plurality of clusters that are data recording units or error correction units. If clusters containing data and blank clusters are recorded as information in the bit map format, the recording/reproducing apparatus can readily access a desired area during a write or read operation.

In particular, bit map information specifying areas containing data is very useful when using a write once disc. In other words, it is required to fast detect a cluster next to a cluster in which data is most recently recorded so as to write data to the write once disc. The bit map information enables fast detection of the next cluster.

Also, it is possible to check a change in the recording state of a write once disc and detect the original data recorded before the change occurs, using the bit map information. The disc recording state may change by recording further data to the write once disc containing data.

SUMMARY

In one general aspect, there is provided a recording apparatus, including: a recording and/or reproducing unit configured to record data on and/or read data from a write once disc, the disc including: a data area, including: a first spare area arranged on a front part of the data area, a user data area in which a user data is recorded, and a second spare area arranged on a rear part of the data area, and a lead-in area, including a temporary disc management area, the temporary disc management area including: a temporary disc defect structure, and a space bitmap, and a controller configured to: control the recording and/or reproducing unit to record the temporary disc defect structure and the space bitmap in the temporary disc management area, the temporary disc defect structure including: information on a size of the first spare area, and information on a size of the second spare area, and location information of the space bitmap, the space bitmap including information which distinguishes a cluster in which data is recorded, from a cluster in which data is not recorded, in a unit of cluster in the data area, and record the temporary disc defect structure and the space bitmap recorded in the temporary disc management area, in a disc management area arranged in the lead-in area, during finalization of the write-once disc.

In another general aspect, there is provided an apparatus to read data from a write once disc, the apparatus including: a reading unit configured to read data from the disc, the disc including: a data area, including: a first spare area arranged on a front part of the data area, a user data area in which a user data is recorded, and a second spare area arranged on a rear part of the data area, and a lead-in area, including a temporary disc management area, the temporary disc management area including: a temporary disc defect structure, and a space bitmap, and a controller configured to: control the reading unit to read the temporary disc defect structure from the temporary disc management area, and perform a defect management on the write once disc using the temporary disc defect structure, wherein the temporary disc defect structure includes: information on a size of the first spare area, information on a size of the second spare area, and location information of the space bitmap, and the space bitmap includes information which distinguishes a cluster in which data is recorded, from a cluster in which data is not recorded, in a unit of cluster in the data area.

In another general aspect, there is provide a write once information storage medium, including: a data area, including: a first spare area arranged on a front part of the data area, a user data area in which a user data is recorded, and a second spare area arranged on a rear part of the data area, and a lead-in area, including a temporary disc management area, the temporary management area including: a temporary disc defect structure, and a space bitmap, wherein the temporary disc defect structure includes: information on a size of the first spare area, information on a size of the second spare area, and location information of the space bitmap, wherein the space bitmap includes information which distinguishes a cluster in which data is recorded, from a cluster in which data is not recorded, in a unit of cluster in the data area, and wherein the temporary disc defect structure and the space bitmap recorded in the temporary disc management area are recorded in a disc management area arranged in the lead-in area, during finalization of the write-once information storage medium.

Other features and aspects will may be apparent from the following detailed description, the drawings, and the claims.

BRIEF DESCRIPTION OF THE DRAWINGS

FIG. 10 illustrates a structure of a single record layer disc allowing management of a data area, according to another embodiment.

FIG. 11 illustrates a detailed structure of the TDMA #1 shown in FIG. 10.

FIG. 12 illustrates a detailed structure of a cluster, shown in FIG. 11, in which both an TDDS and an SBM are recorded.

FIG. 13 illustrates a detailed structure of a cluster containing disc initialization information obtained during disc initialization.

FIG. 14 illustrates a detailed structure of a cluster containing disc re-initialization information.

FIG. 15 illustrates a structure of an SBM area according to an embodiment.

FIG. 16 illustrates a finalized SBM area according to an embodiment.

Figure 1A:
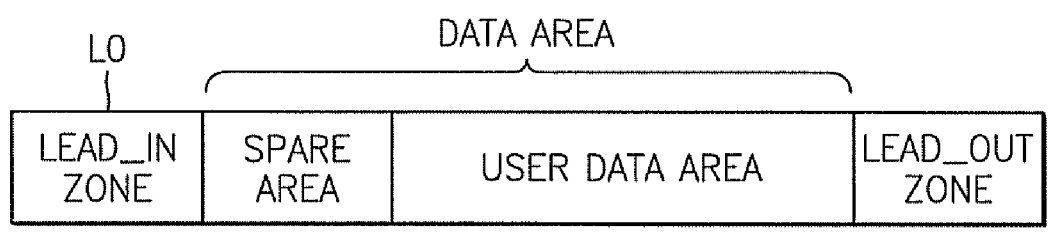
FIGS. 1A and 1B illustrate structures of a write once disc according to embodiments of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF THE EMBODIMENTS

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1A illustrates a structure of a write once disc (hereinafter referred to as the 'disc') according to an embodiment that is a single record layer disc having a record layer L0. The disc includes a lead-in zone, a data area, and a lead-out zone. The lead-in zone is located in an inner part of the disc and the lead-out zone is located in an outer part of the disc. The data area is present between the lead-in zone and the lead-out zone and is divided into a user data area and a spare area. The spare area has a predetermined size starting from the beginning of the data area.

Figure 1B:
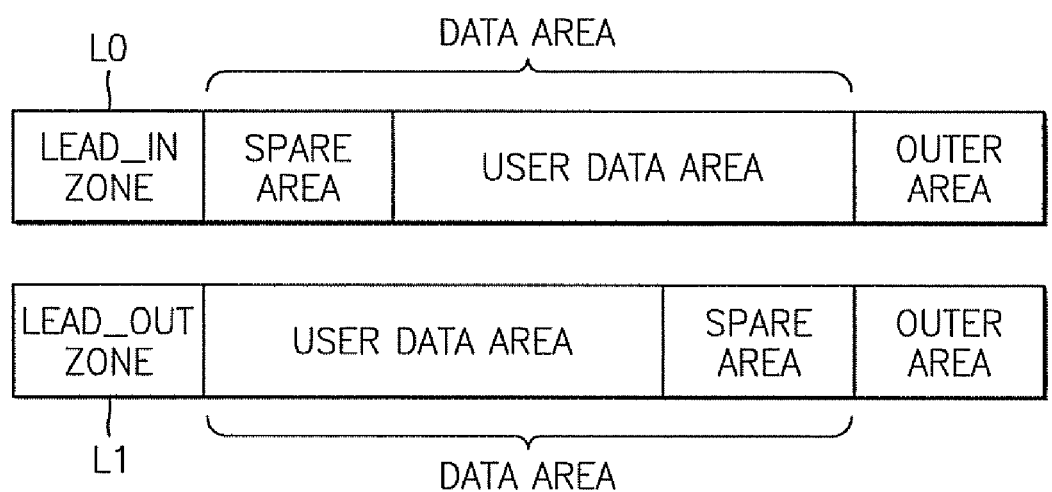

FIG. 1B illustrates a disc that is a double record layer disc having two record layers L0 and L1. A lead-in zone, a data area, and an outer area are sequentially formed from an inner part of the first record layer L0 to its outer part. Also, an outer area, a data area, and a lead-out zone are sequentially formed from an outer part of the second record layer L1 to its inner part. Unlike the single record layer disc of FIG. 1A, the lead-out zone of the second record layer L1 is present in the inner part of the second record layer L1. That is, the disc has an opposite track path (OTP) in which data is recorded starting from the lead-in zone at the inner part of the first record layer L0 toward the outer part and continuing from the outer area of the second record layer L1 to the lead-out zone at the inner part. Spare areas are allocated to the first and second record layers L0 and L1, respectively.

In this embodiment, the spare areas are present between the lead-in zone and the user data area and between the outer area and the user data area. However, the positions and numbers of spare areas are not limited.

Initialization of a disc according to and embodiment will now be described. Disc initialization is a preliminary record operation that is performed prior to use of a disc. More specifically, information regarding the structure of a data area is written to a predetermined area of the disc, thereby enabling a recording/reproducing apparatus to recognize the data area structure. The information specifies whether areas, e.g., a spare area, in which data, regarding disc defect management using a recording/reproducing apparatus, other than user data is recorded are allocated to a data area, and specifies the positions of the areas allocated to the data area. If disc initialization information, i.e., the information regarding the data area structure, is recorded after the disc initialization, the recording/reproducing apparatus is capable of checking the presence and positions of the areas in which information other than the user data is recorded and detecting an area in which the user data is to be recorded.

Hereinafter, embodiments of a disc in which a spare area for disc defect management is formed in a data area, according to an embodiment, will be described with reference to FIGS. 2 through 9.

Figure 2:
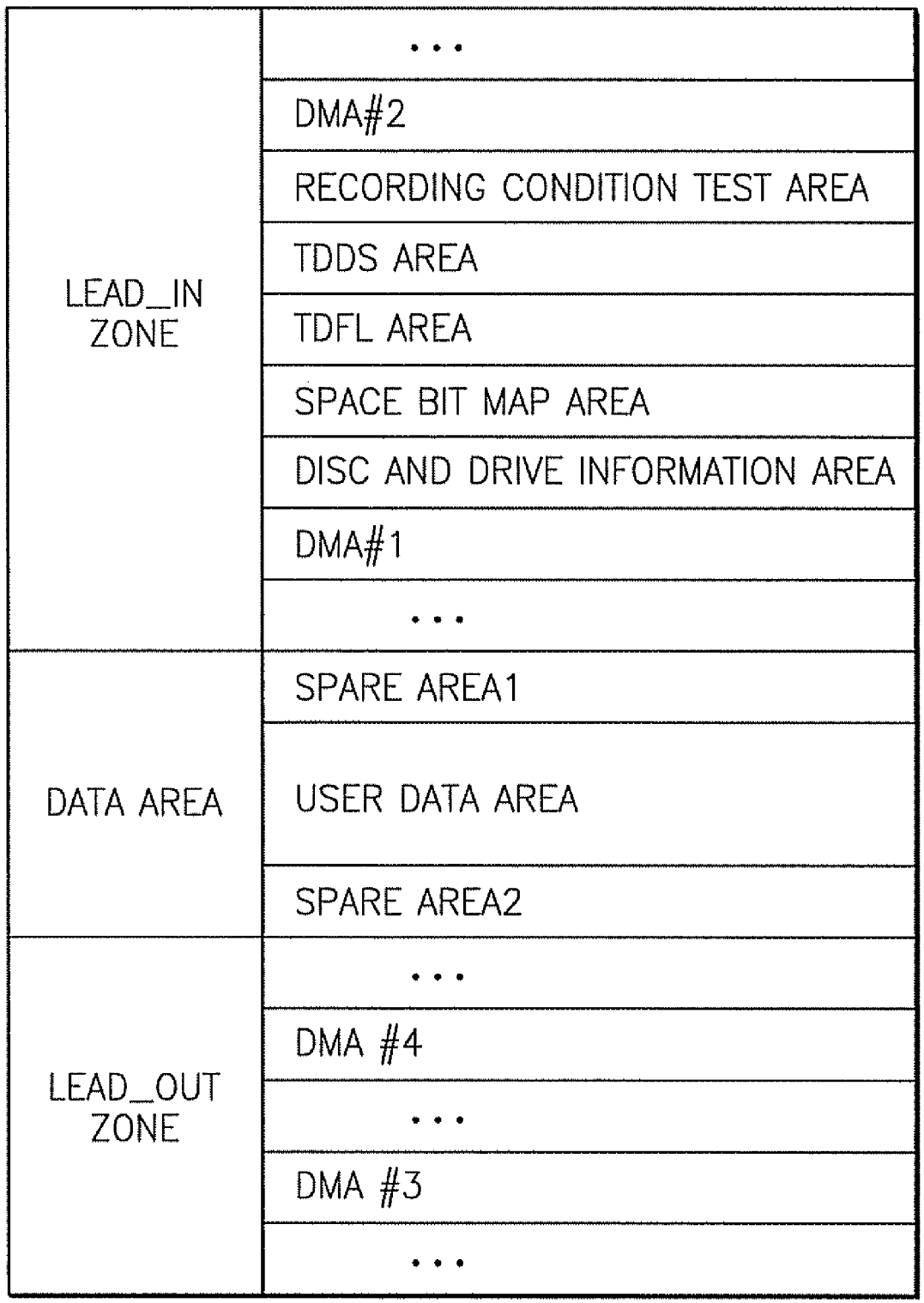
FIG. 2 illustrates a structure of a single record layer disc allowing management of a data area, according to an embodiment.

FIG. 2 illustrates a structure of a single record layer disc allowing management of a data area, according to an embodiment. Referring to FIG. 2, a lead-in zone of the disc includes Defect Management Areas (DMA) DMA1 and DMA2, a recording condition test area, a Temporary Disc Defect Structure (TDDS) area, a Temporary DeFect List (TDFL) area, a space bit map area, and a disc & drive information area.

In general, when a disc is loaded into a recording/reproducing apparatus, the recording/reproducing apparatus reads information from a lead-in zone and/or a lead-out zone to determine how to manage the disc and perform a read/write operation. Therefore, if the amount of the information recorded in the lead-in zone and/or the lead-out zone increases, a longer time will be spent preparing the recording or reproducing of the data after loading the disc. To solve this and/or other problems, embodiments propose temporary management information containing a TDDS and a TDFL, the temporary management information being recorded in a TDFL or a TDDS formed, separated from the lead-in zone and/or the lead-out zone.

If no more data will be recorded on the disc, the recording/reproducing apparatus begins disc finalization during which the recorded TDFL and TDDS are recorded as defect management information in the DMA. Through the disc finalization, only the most recently recorded TDFL and TDDS are copied to the DMA. Accordingly, the recording/reproducing apparatus can complete disc initialization rapidly by reading only the most recently updated information from the DMA. In this case, the defect management information is stored in a plurality of areas, thereby increasing the reliability of information.

Disc defect management according to this embodiment uses the linear replacement method, and thus, the TDFL specifies an area, i.e., a defective area, of the disc in which a defect occurs, and a replacement area that substitutes for the defective area. The TDFL further specifies whether the defective area is a single defective cluster, or a continuous defective cluster in which a series of defects occur physically. The TDDS, which is information managing the TDFL, specifies the recording position of the TDFL.

The lead-in zone includes the space bit map (SBM) area that contains bit map information regarding an area containing data, i.e., information regarding a data recordable area.

The data area includes spare areas #1 and #2 and a user data area.

In this embodiment, the spare areas #1 and #2 are formed at the start and end of the data area, respectively, for a case where disc defect management is performed using a recording/reproducing apparatus during disc initialization.

The lead-out zone includes DMAs #3 and #4 and other areas.

When a user decides to perform disc defect management using the recording/reproducing apparatus and instructs the recording/reproducing apparatus to allocate spare areas in a data area, the recording/reproducing apparatus allocates the spare areas #1 and #2 to predetermined portions of the data area, e.g., at the start and end of the data area. Then, the recording/reproducing apparatus records area allocation information, which indicates the allocation of the spare areas #1 and #2, in a first cluster of a TDDS area. The area allocation information may specify the sizes of the allocated spare areas #1 and #2. If starting and ending addresses of the spare areas #1 and #2 are determined, for example, when the spare areas #1 and #2 are positioned at the start and end of the data area, respectively, the recording/reproducing apparatus can recognize the allocation of the spare areas #1 and #2 and the position and size of each spare area based on information regarding the spare area sizes.

When the starting and ending addresses of the spare areas #1 and #2 are not predetermined, the starting and ending addresses are determined and recorded or the information regarding sizes of the spare areas #1 and #2 is recorded in the first cluster of the TDDS area.

In this embodiment, the area allocation information is recorded in the TDDS area but can be recorded in another area.

After recording the area allocation information in the first cluster of the TDDS, a bit map is recorded in a first cluster of the SBM area, the bit map recording bit corresponding to the positions of the first clusters of the TDDS and the SBM area with 1 and recording bits corresponding to the positions of the other clusters as 0.

If the user does not desire to perform disc defect management using the recording/reproducing apparatus, the recording/reproducing apparatus records the area allocation information, which describes the sizes of the spare areas #1 and #2 as 0, in the first cluster of the TDDS.

After recording the area allocation information in the TDDS, a bit map, which indicates the bits corresponding to the positions of the first clusters of the TDDS and the SBM area as 1 and indicates the bit corresponding to the positions of the other clusters as 0, is recorded in the first cluster of the SBM area.

As previously mentioned, it is possible to change the structure of the data area by re-initializing the disc and updating the area allocation information, even if the area allocation information was recorded in the TDDS and data was recorded on the disc during the previous disc initialization. Disc re-initialization will be later described with reference to FIG. 14.

When the user does not require disc defect management using the recording/reproducing apparatus, no information will be recorded in the DMA. In this case, the area allocation information recorded in the TDDS area is recorded in the DMA even if disc finalization is not being performed.

Meanwhile, a re-writable disc does not include the TDDS, and thus, reproducing information from a disc with a TDDS area containing area allocation information, using a reproducing apparatus for re-writable discs is not possible because of incompatible data structures. To solve this and/or other problems, information recorded in the TDDS area is copied to a DMA when performing disc finalization on the disc.

In other words, if disc defect management using the recording/reproducing apparatus will not be performed, the area allocation information recorded in the TDDS area is recorded in the DMA prior to disc finalization, thereby enabling reproduction of information from a disc using a re-writable disc reproducing apparatus.

Figure 3:
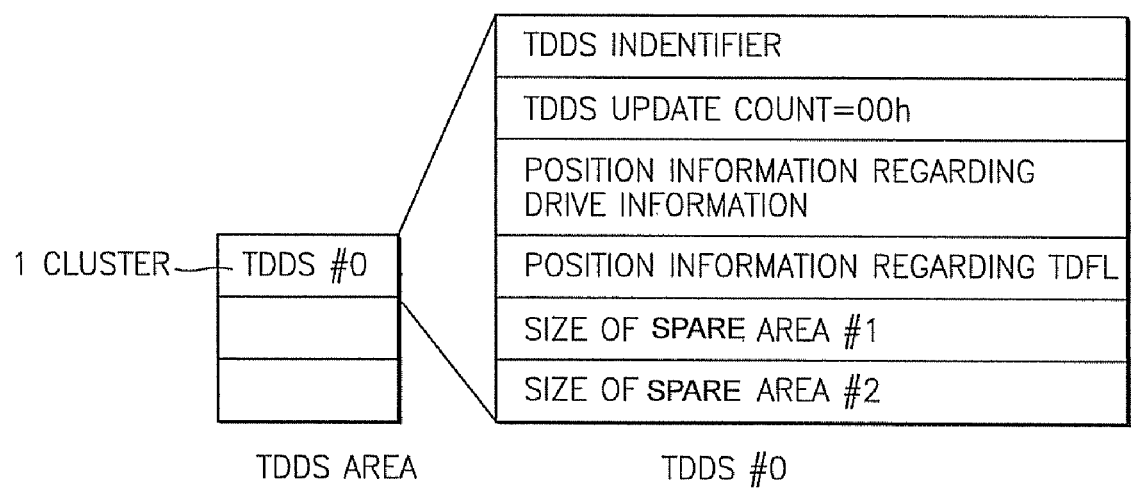
FIG. 3 illustrates a detailed structure of the Temporary Disc Defect Structure (TDDS) area shown in FIG. 2.

FIG. 3 illustrates a structure of the TDDS area shown in FIG. 2, according to an embodiment.

A TDDS is recorded in a cluster of a TDDS area at least once until a recording operation ends. In general, a plurality of TDDS #0, TDDS #1, . . . are recorded in the TDDS area. In this embodiment, TDDS #0 is recorded in a cluster of a TDDS area once when a recording operation ends.

Referring to FIG. 3, the TDDS area consists of a plurality of clusters. A cluster is a basic unit of record and consists of a predetermined number of sectors. A sector is a physical basic unit of a disc.

During disc initialization, when a user determines whether a spare area will be allocated or not, area allocation information indicating the user's determination is recorded in the TDDS #0. The TDDS #0 includes a TDDS identifier, counter information indicating the number of updates to the TDDS #0, position information regarding drive information, position information regarding a corresponding TDFL, if any, information regarding the size of a spare area #1, and information regarding the size of a spare area #2. As previously described, when the user does not require disc defect management using the recording/reproducing apparatus and allocates spare areas in a data area, the sizes of spare areas #1 and #2 are recorded as '0'.

Although a detailed structure of a TDFL area is not illustrated, a TDFL #i contains information regarding defects occurring in data recorded during a recording operation #i and information regarding replacements for the defects. Also, previous TDFLs #0, #1, #2, . . . , #i−1 are not accumulated in the TDFL #i and only information regarding defects occurring in a recording area made during the corresponding recording operation #i is recorded in the TDFL #i, thereby minimizing a recording capacity and enabling efficient use of a recording space of a TDDS.

Figure 4:
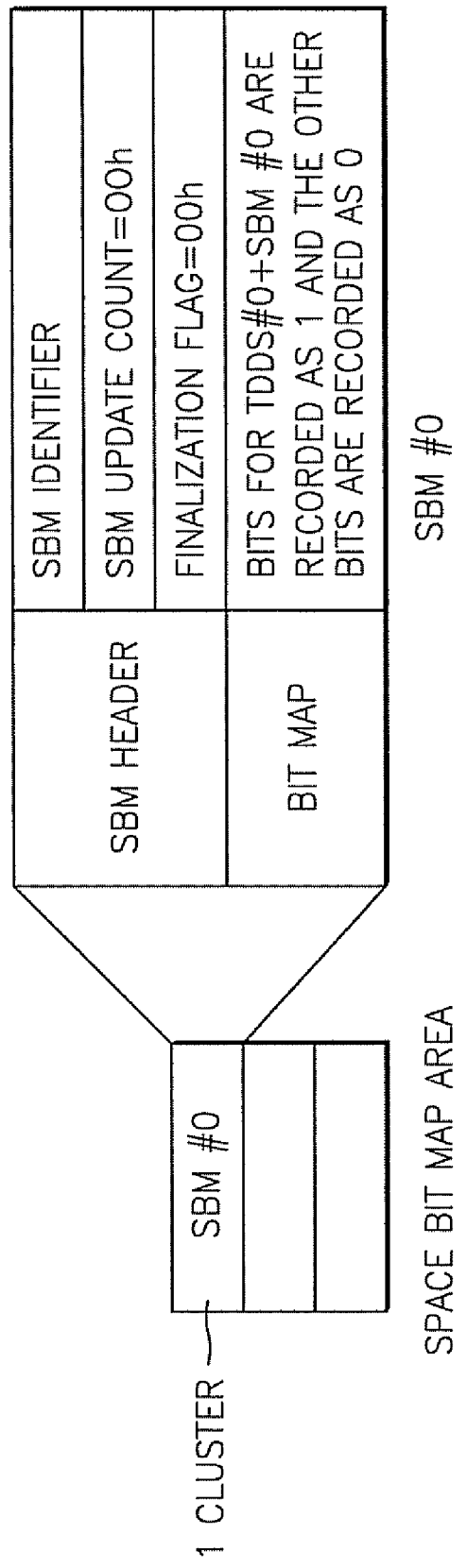
FIG. 4 illustrates a detailed structure of the Space Bit Map (SBM) area of FIG. 2.

FIG. 4 illustrates a structure of the SBM area shown in FIG. 2, according to an embodiment. The SBM area comprises a plurality of clusters and each SBM #i is recorded in a cluster.

Each SBM #i includes an SBM header area and a bit map area. In the SBM header area, SBM identifier information, counter information indicating the number of updates to the SBM #i, and a finalization flag are recorded. The finalization flag will be later described.

The bit map area contains a bit map that indicates clusters containing data and blank clusters with different bit values in cluster units with respect to entire recordable areas of a disc.

After recording a TDDS #0, an SBM #0 is recorded in a first cluster of the SBM area. In the bit map of the SBM #0, a bit corresponding to the position of a first cluster of a TDDS and a bit corresponding to the position of the first cluster are expressed with 1, and bits corresponding to the remaining clusters are expressed with 0.

Accordingly, recording size information regarding spare areas in the TDDS #0 allows the recording/reproducing apparatus to check the presence of spare areas and determine the positions or sizes of allocated spare areas. Also, the recording/reproducing apparatus is capable of rapidly recognizing an area containing data and a blank area of the disc by recording the SBM #0 after recording the TDDS #0.

In the disc, shown in FIG. 2, a TDDS area, a TDFL area, and an SBM area are individually formed and a TDDS, a TDFL, and an SBM are recorded therein in cluster units, respectively. However, recording of the TDDS and the SBM is not limited to these areas, that is, they may be recorded in different areas.

Figure 5:
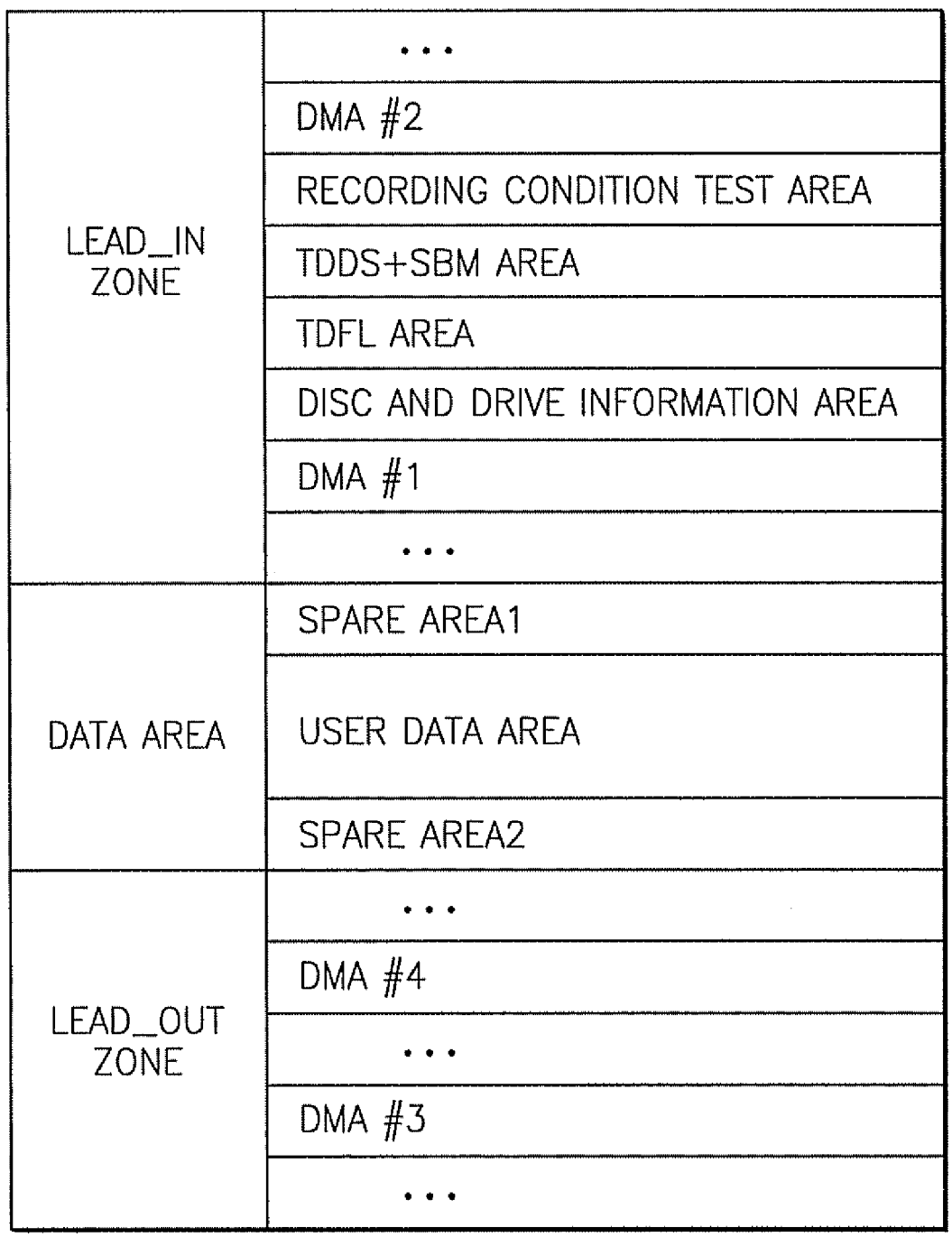
FIG. 5 illustrates a structure of a single record layer disc allowing management of a data area, according to another embodiment.

FIG. 5 illustrates a structure of a single record layer disc allowing management of a data area, according to an embodiment. In this embodiment, a lead-in zone includes an area in which both a TDDS and an SBM are recorded.

When a user desires to perform disc defect management using a recording/reproducing apparatus and instructs the recording/reproducing apparatus to allocate spare areas, the recording/reproducing apparatus allocates spare areas #1 and #2 at the start and end of a data area in predetermined sizes, respectively.

Then, the recording/reproducing apparatus records allocation information, which indicates the allocation of the spare areas #1 and #2, in first clusters of the TDDS and the SBM areas.

Figure 6:
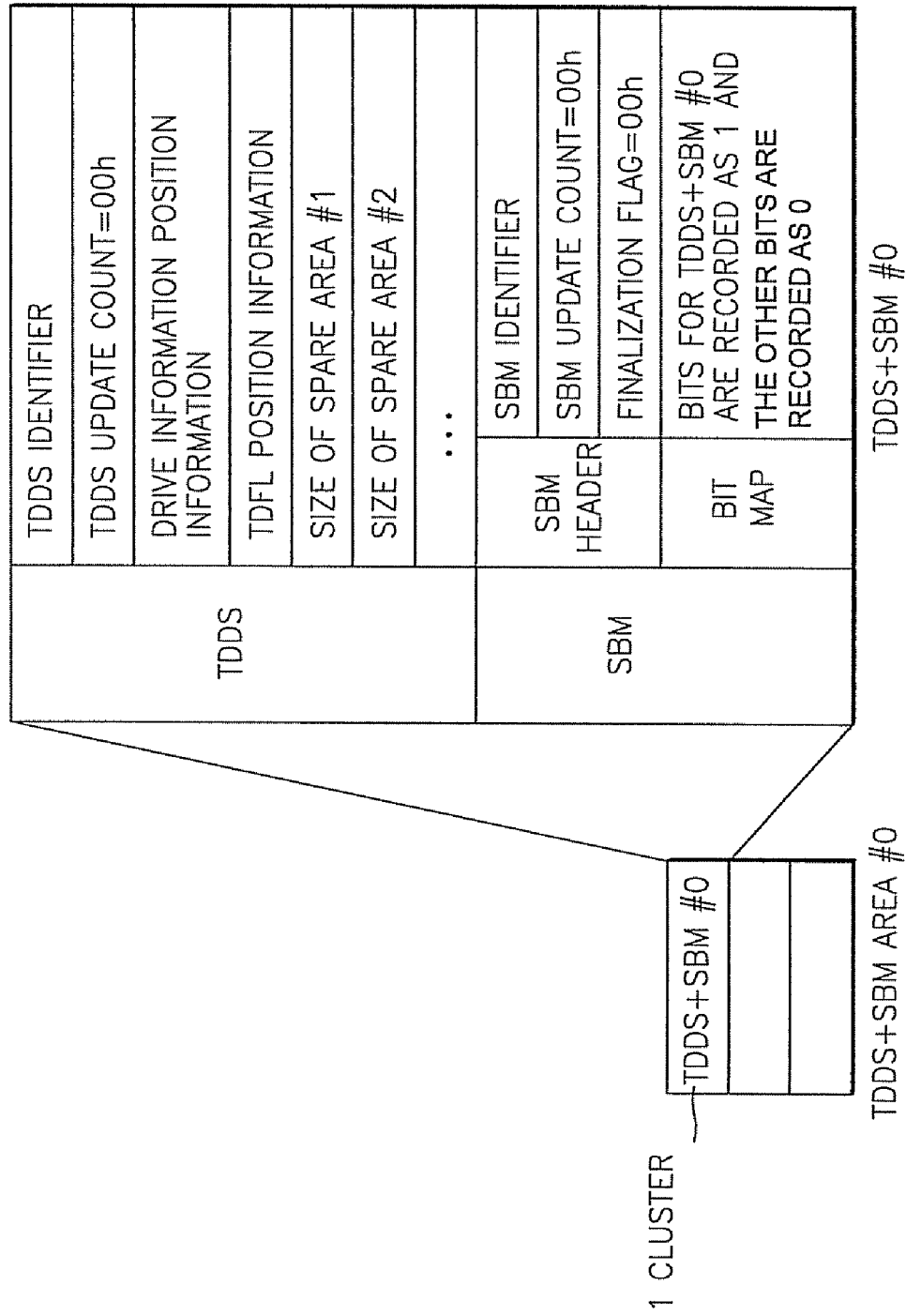
FIG. 6 illustrates a detailed structure of the TDDS+SBM area shown in FIG. 5.

FIG. 6 illustrates a detailed structure of the TDDS+SBM area shown in FIG. 5. Referring to FIG. 6, a TDDS and an SBM are recorded in a cluster. The TDDS contains size information, i.e., area allocation information, regarding each spare area and the SBM, and the SBM contains a bit map.

After recording the area allocation information in a first cluster of the TDDS+SBM area, the bit map records a bit for the position of the first cluster of the TDDS+SBM area as 1 and bits for the positions of the other clusters as 0.

Figure 7:
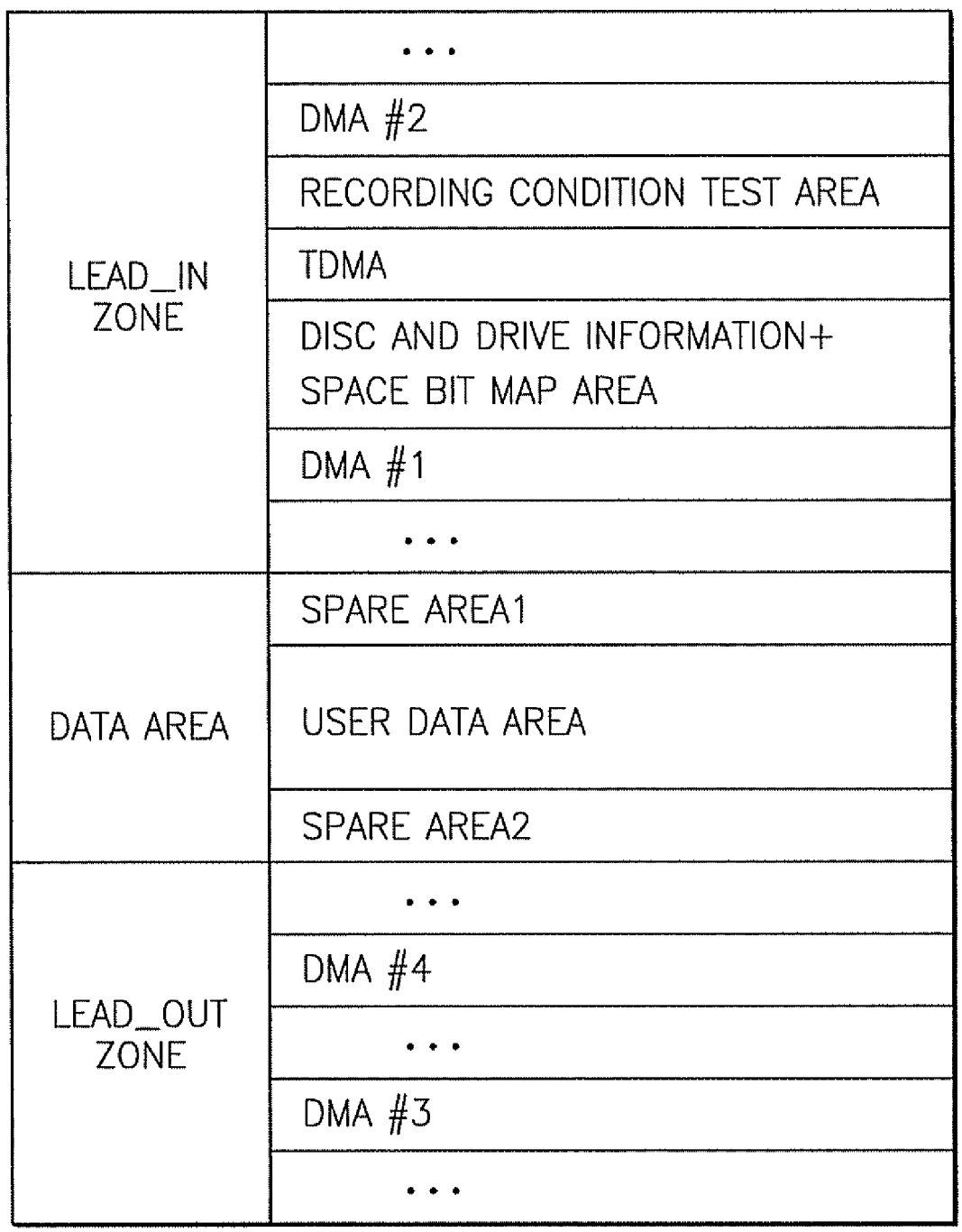
FIG. 7 illustrates a structure of a single record layer disc allowing management of a data area, according to another embodiment.

FIG. 7 illustrates a structure of a single record layer disc management of a data area, according to an embodiment. In this embodiment, a lead-in zone includes a Temporary Disc Management Area (TDMA) area in which both a TDFL and a TDDS are recorded, and a disc & drive information+SBM area in which both disc and drive information and an SBM are recorded. That is, the TDFL and TDDS are recorded in a cluster and the disc & drive information and SBM are recorded in a cluster.

Similarly to the embodiments shown in FIGS. 2 and 5, a user may determine disc defect management using a recording/reproducing apparatus and instructs the recording/reproducing apparatus to allocate spare areas to a data area of a disc. Then, the recording/reproducing apparatus allocates spare areas #1 and #2 to the start and end of the data area in predetermined sizes.

Next, the recording/reproducing apparatus records area allocation information that indicates the allocation of the spare areas #1 and #2 in a first cluster of the TDMA.

Figure 8:
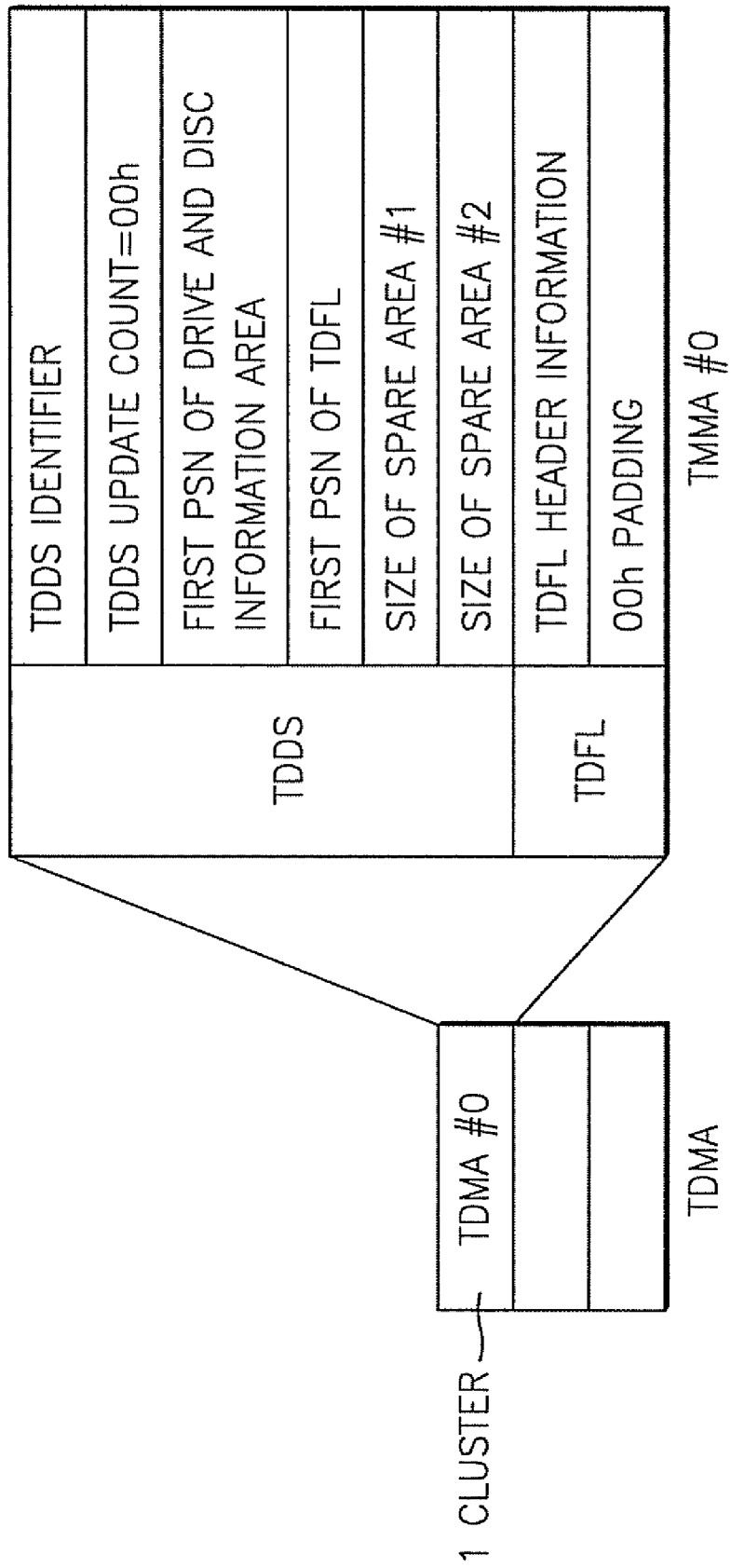
FIG. 8 illustrates a detailed structure of the Temporary Disc Management Area (TDMA) shown in FIG. 7.

FIG. 8 illustrates a detailed structure of the TDMA shown in FIG. 7. The TDMA consists of clusters in which disc defect management information is recorded. In each cluster, a TDDS and a TDFL are recorded. The TDDS contains information regarding positions of the spare areas, the information being area allocation information.

Figure 9:
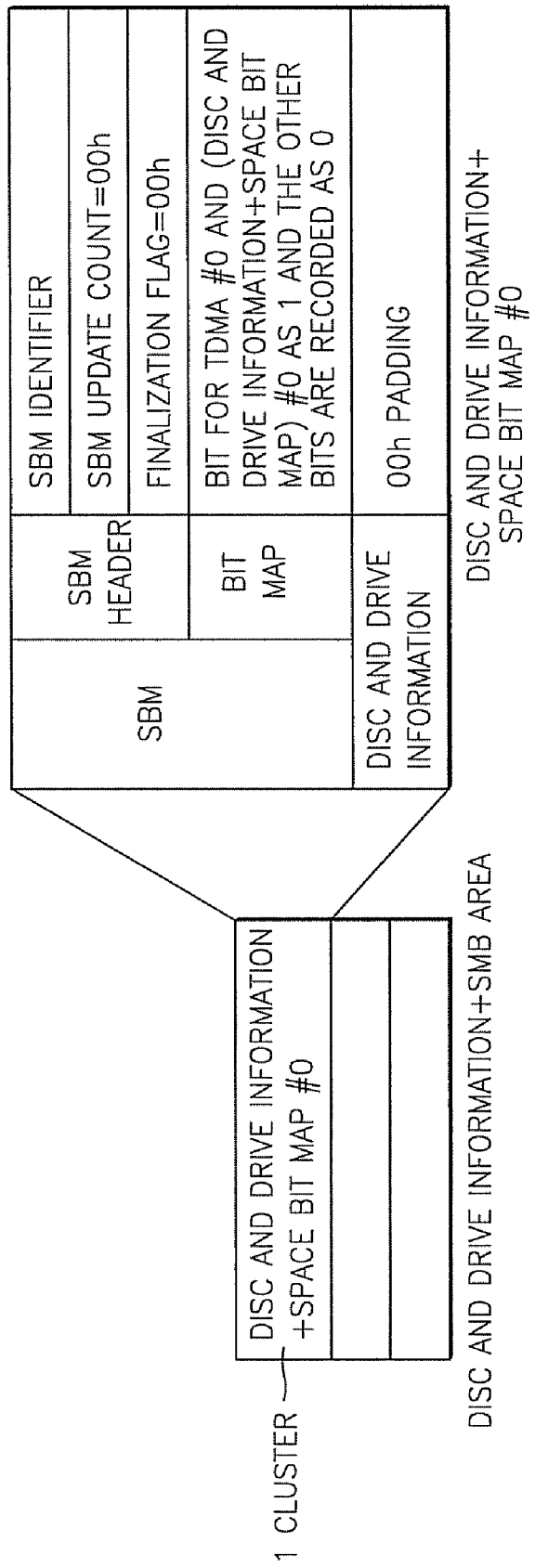
FIG. 9 illustrates a detailed structure of the disc & drive information+SBM area shown in FIG. 7.

FIG. 9 illustrates a detailed structure of the disc & drive information+SBM area shown in FIG. 7, according to an embodiment.

Each cluster contains disc & drive information and SBM information. The SBM information contains a bit map.

Information regarding spare areas is recorded in a first cluster of a TDMA. Next, a bit map indicates bits for first clusters of the TDMA and the disc & drive information and SBM area with 1 and bits for the remaining clusters with 0.

FIG. 10 illustrates a structure of a single record layer disc allowing management of a data area, according to an embodiment. Unlike the disc according to the embodiments described above, the disc of FIG. 10 further includes a TDMA #2 in a data area, in addition to a TDMA #1 in a lead-in zone.

The TDMAs #1 and #2 are different from each other in that updated information is recorded in the TDMA #1 either before ejecting of a disc from a recording/reproducing apparatus or during disc initialization, and updated information is recorded in the TDMA #2 in operation units during the recording of data on the disc. Here, the operation units are units in which a verify-after-write method is facilitated. In the verify-after-write method, data is recorded in cluster units and then verified.

If a TDMA is allocated only to a lead-in zone, the size of the TDMA is limited, thus making it difficult to frequently update information. The number of necessary information updates may be reduced by updating a TDDS when ejecting the disc from the recording/reproducing apparatus. However, in this case, the updating of the TDDS will be incompletely terminated when power to the recording/reproducing apparatus is interrupted due to an unexpected accident, such as a power failure, during a write operation.

To solve this and/or other problems, the disc of FIG. 10 further includes the TDMA #2 in the data area. The TDDS is updated and recorded in the TDMA #2 in units in which the verify-after-write method is facilitated, thereby preparing for a failure in updating the TDDS due to an interruption of the power supply. Just prior to ejecting the disc, final defect information and state information regarding the disc are repeatedly recorded in both the TDMAs #1 and #2, thereby increasing the robustness of information.

The reason for forming the TDMA #2 in the data area is that frequent updating of information in the TDMA #2 requires the TDMA #2 to be spacious. On the other hand, the TDMA #1 is not required to be spacious and thus is formed in the lead-in zone (or a lead-out zone).

If a user does not desire disc defect management using a recording/reproducing apparatus or does not require allocation of the TDMA #2 although the user wants disc defect management using the recording/reproducing apparatus during disc initialization, the TDMA #2 will not be allocated to the data area and area allocation information indicating this information is recorded in the TDMA #1.

FIG. 11 illustrates a detailed structure of the TDMA #1 shown in FIG. 10. Referring to FIG. 11, a TDFL, a TDDS, and an SBM are recorded in the TDMA #1. More specifically, both the TDDS and the SBM are recorded in a cluster TDDS+SBM #k and the TDFL is recorded in another cluster (k is an integer greater than 0). The TDMA #2 has the same construction as the TDMA #1 and its detailed description will be omitted.

FIG. 12 illustrates a detailed structure of the cluster TDDS+SBM #k, shown in FIG. 11, in which both a TDDS and an SBM are recorded. Referring to FIG. 12, the TDDS specifies the positions of a recording condition test area, drive information, a TDFL, spare areas #1 and #2, a TDMA #2, a TDDS+SBM area for another record layer, and a TDDS+SBM area for another TDMA.

If the starting and ending addresses of each area of the disc are determined, information regarding the sizes of spare areas #1 and #2 and TDMA #2 as their position information is sufficient. Otherwise, the position information is indicated with their starting and ending addresses corresponding to each area of the disc.

If the disc has at least two record layers, an SBM for each record layer is required.

FIG. 13 illustrates a detailed structure of a cluster TDDS+SBM #0 containing disc initialization information obtained during disc initialization. FIG. 13 illustrates a case where spare areas #1 and #2 and a TDMA #2 are formed in a data area. Referring to FIG. 13, information regarding sizes of spare areas #1 and #2 and the TDMA #2 is recorded as disc initialization information. In this case, it is understood that starting and ending addresses of each area have already been determined.

Even if spare areas are allocated to the data area and the disc is initialized by recording area allocation information that indicates the allocation, the structure of the data area may be changed by re-initializing the disc and updating the area allocation information.

FIG. 14 illustrates a detailed structure of a cluster TDDS+SBM #n+1 containing disc re-initialization information. Referring to FIG. 14, information that specifies a change in the sizes of spare areas #1 and #2 and a TDMA #2 is recorded in a TDDS area.

It may be presumed that the spare area #1, the TDMA #2, a user data area, and the spare area #2 are sequentially formed in a data area, and defect information is recorded in the spare area #2 starting from a cluster with the largest address to a cluster with the smallest address. In this case, disc re-initialization is performed to effectively use a recording area between a cluster with the largest address of the user data area and the cluster with the smallest address of the spare area #2.

In other words, the disc re-initialization increases or decreases the size of the spare area #2, thus enabling effective use of the recording area.

Disc re-initialization information is recorded in at least one cluster TDDS+SBM belonging to a TDMA #1 or the TDMA #2.

Hereinafter, an SBM that is information regarding a data recording area will be described in greater detail.

FIG. 15 illustrates a structure of an SBM area according to an embodiment. Referring to FIG. 15, SBMs #0 through #n, which provide data recording area information, are recorded in the SBM area. In this embodiment, an SBM #i is recorded in a cluster (i is an integer from 0 to n). However, as illustrated in FIGS. 6 through 9, SBM #i may be recorded together with other information in a cluster.

Each SBM #i provides header information containing an SBM descriptor, a finalization flag, and an update counter; and a bit map #i (i is an integer from 0 to n) that indicates recordable areas of entire recording areas of the disc in cluster units.

If data is further recorded on the disc and data recording area information changes, each SBM #i, which contains a new bit map describing data recording areas, is generated and recorded. In this case, the update counter represents the number of times the data recording area information is updated.

An instant of time when each SBM #i is generated and updated may be differently determined depending on a program installed in a recording/reproducing apparatus. However, after recording data on the disc, a new SBM #i must be generated and recorded before ejecting the disc from the recording/reproducing apparatus.

The finalization flag indicates whether the disc is finalized or not.

FIG. 16 illustrates a finalized SBM area according to an embodiment. The finalization flag for a header of an SBM is set to 0 and recorded together with other information. Referring to FIG. 16, an SBM recorded right before disc finalization is an SBM #n. If a finalization command is given from a host such as a computer to a recording/reproducing apparatus, the recording/reproducing apparatus indicates completion of disc finalization by changing a finalization flag among information regarding the SBM #n, which is last updated, from 0 to 1, and recording the SBM #n again.

If necessary, the recording/reproducing apparatus may allow no more SBMs to be recorded by recording data such as "ffh" in an area next to an area containing the SBM #n having the finalization flag '1', thereby preventing additional recording of data on the disc.

A user can maintain the recording state of the disc at an instant of time when disc finalization is performed, based on an SBM having the finalization flag '1'. Even if data recorded on the finalized disc is changed or new data is added to the original data without permission, detecting the original data recorded during the disc finalization by referring to a bit map contained in the SBM having the finalization flag '1' is possible. Therefore, data that is added after the disc finalization can be easily detected.

An area in which each SBM #i is recorded is positioned in at least one of a data area, a lead-in zone, and a lead-out zone as shown in FIGS. 1A and 1B.

Spare areas and TDMAs are allocated to a data area in the above embodiments, but an area to which the spare areas and the TDMAs are allocated and areas allocated to the data area are not limited. For example, a TDMA area and a TDDS area may be further allocated to the data area. Also, a TDDS area and an SBM area are allocated to a lead-in zone in the above embodiments but may be formed in a data area or a lead-out zone.

Although not shown in the drawings, a TDFL area may be formed in the data area. In this case, if a user desires disc defect management using a recording/reproducing apparatus, the user allocates a spare area #1, a spare area #2, and the TDFL area and records a TDDS and an SBM as described above. The TDFL may be positioned between the lead-in zone and the spare area #1, between the spare area #1 and a user data area, at the middle of the user data area, between the user data area and the spare area #2, and between the spare area #2 and a lead-out area, If the user does not desire disc defect management using the recording/reproducing apparatus, the allocation of spare areas is not required. However, if the user records data in real time using disc defect information obtained by scanning a disc, the TDFL area is required to store the disc defect information. Therefore, the TDFL is allocated during disc initialization.

In the above embodiments according to an embodiment, management of spare areas and recording of a bit map are described with respect to a single record layer disc. However, embodiments may be applied to a dual record layer disc.

A write once disc according to the present invention includes a TDMA for disc defect management. However, if the disc is a re-writable disc, the disc includes a DMA but does not include a TDMA. Therefore, a re-writable disc recording/reproducing apparatus is not capable of reproducing/recording data from/on a disc with a TDMA, that is, a disc compatibility issue is caused. For a solution to the disc compatibility, a TDFL recorded in a TDDS area is copied to a TDMA prior to finalization of the disc.

Figure 17:
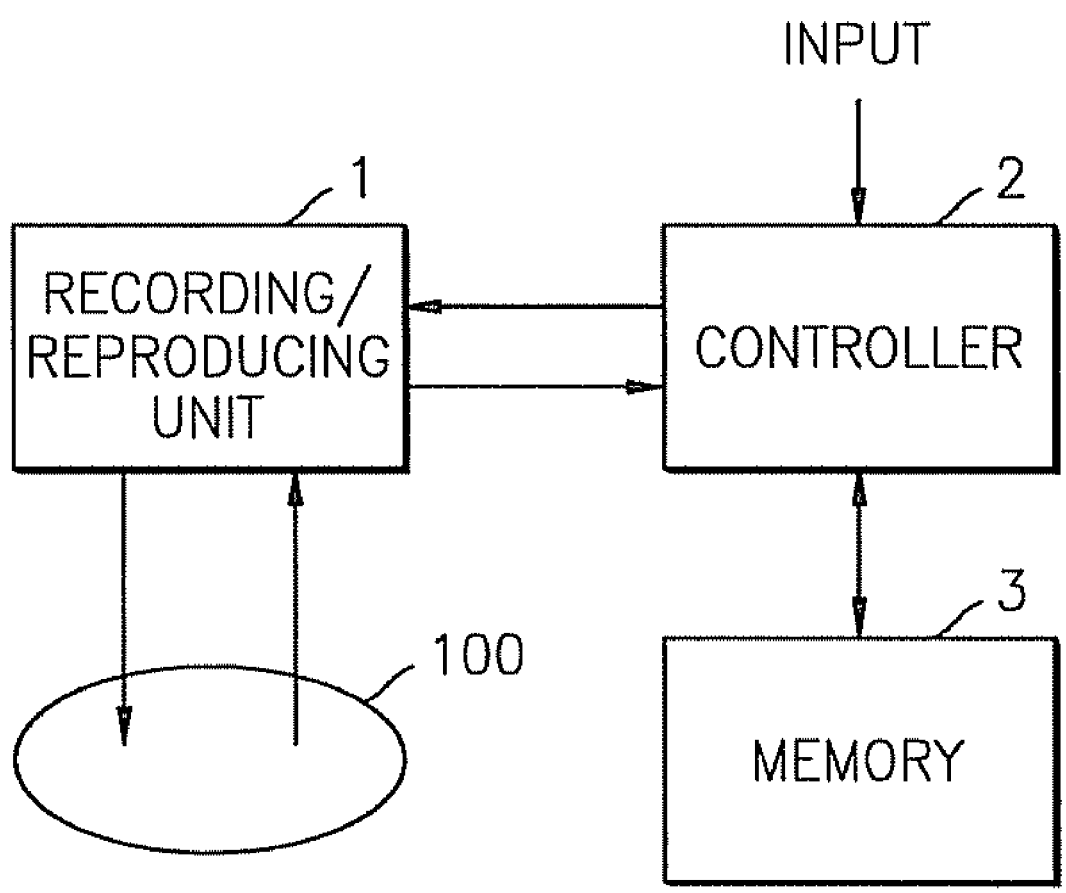
FIG. 17 is a block diagram of a recording apparatus according to an embodiment.

FIG. 17 is a block diagram of a recording/reproducing apparatus according to an embodiment. Referring to FIG. 17, the recording/reproducing apparatus includes a recording/reproducing unit 1, a controller 2, and a memory 3.

Under control of the controller 2, the recording/reproducing unit 1 records data on a disc 100 according to an embodiment and reads the data from the disc 100 to verify the accuracy of the recorded data.

The controller 2 manages a data area of the disc 100. Also, the controller 2 performs a verify-after-write method in which data is recorded on the disc 100 in predetermined units and the accuracy of the recorded data is verified to detect if an area of the disc 100 has a defect. More specifically, the controller 2 records user data on the disc 100 in predetermined units and verifies the recorded user data to detect an area of the disc 100 in which a defect exists. Next, the controller 2 creates a Temporary DeFect List (TDFL) and a Temporary Disc Defect Structure (TDDS) that specify a position of the area with the defect. Next, the controller 2 temporarily stores the created TDFL and TDDS in the memory 3. When the amount of the stored TDFL and TDDS reaches a predetermined level, the controller 2 records the TDFL and TDDS in a predetermined area, e.g., a Temporary Disc Management Area (TDMA), of the disc 100.

Here, the disc 100 includes discs according to the aforementioned embodiments.

When a user decides to perform disc defect management using the recording apparatus such as that shown in FIG. 17 and instructs the recording apparatus to allocate spare areas in a data area, the recording apparatus allocates the spare areas, e.g., a spare area #1 and a spare area #2, to predetermined portions of the data area of the disc, e.g., at the start and end of the data area.

Then, the recording/reproducing apparatus records area allocation information, which indicates the allocation of the spare areas #1 and #2, in a first cluster of a TDDS. The area allocation information may specify sizes of the allocated spare areas #1 and #2. If starting and ending addresses of the spare areas #1 and #2 are determined, for example, when the spare areas #1 and #2 are positioned at the start and end of the data area, respectively, the recording apparatus can recognize the allocation of the spare areas #1 and #2 and also the positions and sizes of the spare areas #1 and #2 based only on information regarding the spare area sizes.

For this reason, when the starting and ending addresses of the spare areas #1 and #2 are not determined, these addresses are determined and recorded or the information regarding sizes of the spare areas #1 and #2 is recorded in the first cluster of the TDDS.

A method of managing a data area of a disc using a recording apparatus according to an embodiment will now be described with reference to FIGS. 17 and 18.

Figure 18:
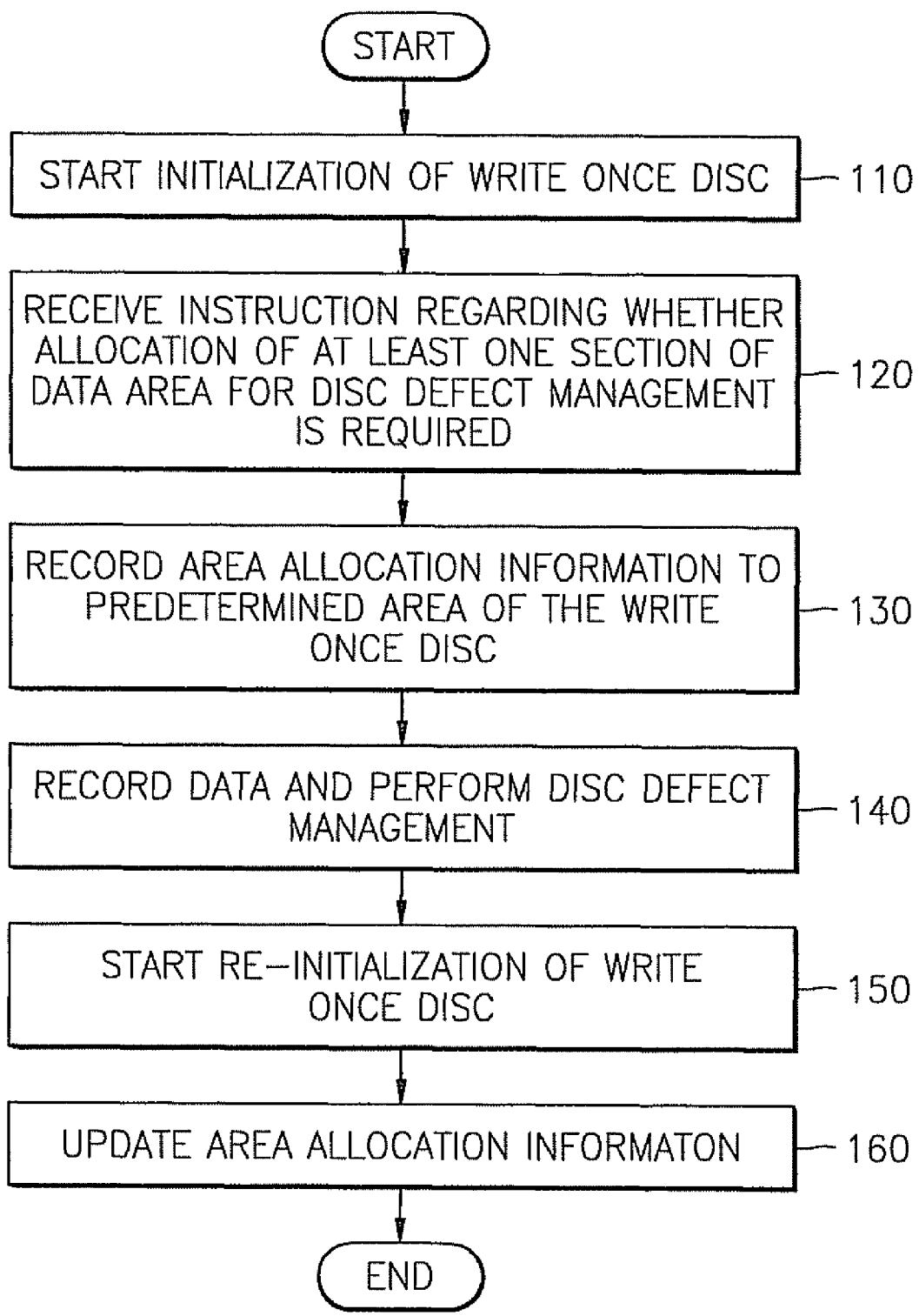
FIG. 18 is a flowchart illustrating a method of managing a data area of a write once disc, according to an embodiment.

FIG. 18 is a flowchart illustrating a method of managing a data area of the disc 100, according to an embodiment. Initialization of the disc 100 is performed in response to user input before recording user data on the disc 100 (operation 110). Next, an instruction regarding whether allocation of at least one section of a data area of the disc 100 for disc defect management is required or not is transmitted to the controller 2 from a host apparatus such as a computer (operation 120). As previously mentioned, allocation of a section, such as a spare area or a TDMA, of the data area for disc defect management is regarded as well known to those skilled in the art. Alternatively, a recording/reproducing apparatus other than the host apparatus is capable of determining whether the at least one section of the data area will be allocated.

Next, the controller 2 controls the recording/reproducing unit 1 to record area allocation information, which describes whether the at least one section of the data area has been allocated or not, in a predetermined area of the disc 100 (operation 130). The area allocation information may specify a size of the at least one portion for disc defect management. Presuming that, as shown in FIG. 2, the at least one section for disc defect management includes a spare area #1 and a spare area #2 and a starting position of the spare area #1 and an ending position of the spare area #2 have been located at a start and end of the data area, respectively. In this case, a recording apparatus is capable of recognizing not only allocation of the spare areas #1 and #2, but also their location and sizes based only on information regarding the sizes of the spare areas #1 and #2.

When a user does not require disc defect management when using the recording apparatus and does not allocate the at least one section, such as a spare area, of the data area, the area allocation information indicating the size of the at least one section as 0 is recorded in a predetermined area of the disc 100.

The area allocation information may be recorded in a TDDS formed in at least one of a lead-in zone, a data zone, and a lead-out zone of the disc 100. Also, a TDDS may be recorded in various areas as shown in FIGS. 3, 6, 8, and 12.

After the initialization of the disc 100 is completed by recording the area allocation information on the disc 100 in operation 130, the recording apparatus may record the user data on the disc 100 and perform disc defect management.

After operation 130, the recording apparatus records the user data in a user data area of the disc 100 and performs disc defect management using the spare areas and the TDMA (operation 140).

Even after disc initialization, re-initialization of the disc 100 allows changing of a structure of the data area of the disc 100.

Next, the disc 100 is re-initialized in response to user input (operation 150). Then, a command that instructs the structure of the data area to be redefined by allocation of new areas thereto is input from the host apparatus to the controller 2.

Then, the controller 2 controls the recording/reproducing unit 1 to record area allocation information regarding the new areas in a predetermined area of the disc 100, thereby updating the area allocation information (operation 160).

Information, e.g., an SBM, regarding areas containing data is recorded on the disc 100. Header information of the SBM includes a finalization flag that represents whether more data can be recorded on a disc. When the finalization flag is 1, a change in a disc recording state may be checked and the original data before the change may be detected, using a bit map corresponding to the finalization flag 1.

If the user does not desire to perform disc defect management using the recording apparatus, no data is recorded in a DMA. Thus, the area allocation information recorded in the TDMA is recorded in the DMA regardless of whether disc finalization is completed or not.

Because a re-writable disc does not include a TDDS area, reproducing data from a write one disc with a TDMA containing area allocation information, using a re-writable disc reproducing apparatus is not possible due to compatibility problems. To solve this and/or other problems, information recorded in the TDMA is recorded in the DMA during disc finalization, thereby enabling disc compatibility.

If disc defect management using the recording apparatus is not required, the area allocation information recorded in the TDMA is recorded in the DMA before disc finalization, thereby enabling reproduction of data from the disc using the re-writable disc reproducing apparatus.

For example, although not shown in the drawings, a reproducing apparatus reproducing data from the disc 100 containing the area allocation information, according to an embodiment, having a similar structure to that of the recording apparatus of FIG. 17 except that the reproducing apparatus includes only a reproducing unit, for only data reading, instead of the recording/reproducing unit 1 of the recording/reproducing apparatus. When the disc 100 is loaded into the reproducing apparatus according to an embodiment, the reproducing apparatus accesses a predetermined area, e.g., a TDMA, which contains the last updated area allocation information so as to read the last updated area allocation information. Then, the reproducing apparatus obtains, from the last updated area allocation information, information regarding the location of at least one section of the data area for disc defect management. As described above, the at least one section includes the TDMA and the spare areas. Because the reproducing apparatus is capable of completely recognizing a structure of the data area based on the area allocation area, the reproducing apparatus can read not only the user data but also data, for disc defect management, which is stored in the TDMA and the spare areas allocated to the data area.

As described above, according to an embodiment, area allocation information regarding a structure of a data area is recorded on a write once disc, thus allowing a recording/reproducing apparatus to recognize the data area structure. Therefore, allocating areas, such as a spare area, for disc defect management other than an area for storing user data, to the data area, enables efficient use of the disc.

Also, after disc initialization, the structure of the data area may be changed by updating the area allocation information through disc re-initialization.

Further, a bit map, which specifies data recordable areas, is recorded in a predetermined area of the disc, thereby enabling the recording/reproducing apparatus to quickly access a desired area. The bit map also allows the recording/reproducing apparatus to check whether there is a change in a disc recording state and detect data originally recorded before the change, the change being occurred by recording additional data on the disc.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A recording apparatus, comprising:
a recording and/or reproducing unit configured to record data on and/or read data from a write once disc, the disc comprising:
a data area, comprising:
a first spare area arranged on a front part of the data area;
a user data area in which a user data is recorded; and
a second spare area arranged on a rear part of the data area; and
a lead-in area, comprising a temporary disc management area, the temporary disc management area comprising:
a temporary disc defect structure; and
a space bitmap; and
a controller configured to:
control the recording and/or reproducing unit to record the temporary disc defect structure and the space bitmap in the temporary disc management area, the temporary disc defect structure comprising:
information on a size of the first spare area; and
information on a size of the second spare area; and
location information of the space bitmap,
the space bitmap comprising information which distinguishes a cluster in which data is recorded, from a cluster in which data is not recorded, in a unit of cluster in the data area, and
record the temporary disc defect structure and the space bitmap recorded in the temporary disc management area, in a disc management area arranged in the lead-in area, during finalization of the write-once disc.

2. An apparatus to read data from a write once disc, the apparatus comprising:
a reading unit configured to read data from the disc, the disc comprising:
a data area, comprising:

a first spare area arranged on a front part of the data area;
a user data area in which a user data is recorded; and
a second spare area arranged on a rear part of the data area; and
a lead-in area, comprising a temporary disc management area, the temporary disc management area comprising:
a temporary disc defect structure; and
a space bitmap; and
a controller configured to:
control the reading unit to read the temporary disc defect structure from the temporary disc management area, and
perform a defect management on the write once disc using the temporary disc defect structure,
wherein the temporary disc defect structure comprises:
information on a size of the first spare area,
information on a size of the second spare area, and
location information of the space bitmap,
wherein the space bitmap comprises information which distinguishes a cluster in which data is recorded, from a cluster in which data is not recorded, in a unit of cluster in the data area, and
wherein the temporary disc defect structure and the space bitmap recorded in the temporary disc management area are recorded in a disc management area arranged in the lead-in area, during finalization of the write-once information storage medium.

3. A write once information storage medium, comprising:
a data area, comprising:
a first spare area arranged on a front part of the data area;
a user data area in which a user data is recorded; and
a second spare area arranged on a rear part of the data area; and
a lead-in area, comprising a temporary disc management area, the temporary management area comprising:
a temporary disc defect structure; and
a space bitmap,
wherein the temporary disc defect structure comprises:
information on a size of the first spare area,
information on a size of the second spare area, and
location information of the space bitmap,
wherein the space bitmap comprises information which distinguishes a cluster in which data is recorded, from a cluster in which data is not recorded, in a unit of cluster in the data area, and
wherein the temporary disc defect structure and the space bitmap recorded in the temporary disc management area are recorded in a disc management area arranged in the lead-in area, during finalization of the write-once information storage medium.

* * * * *